Patented July 20, 1954

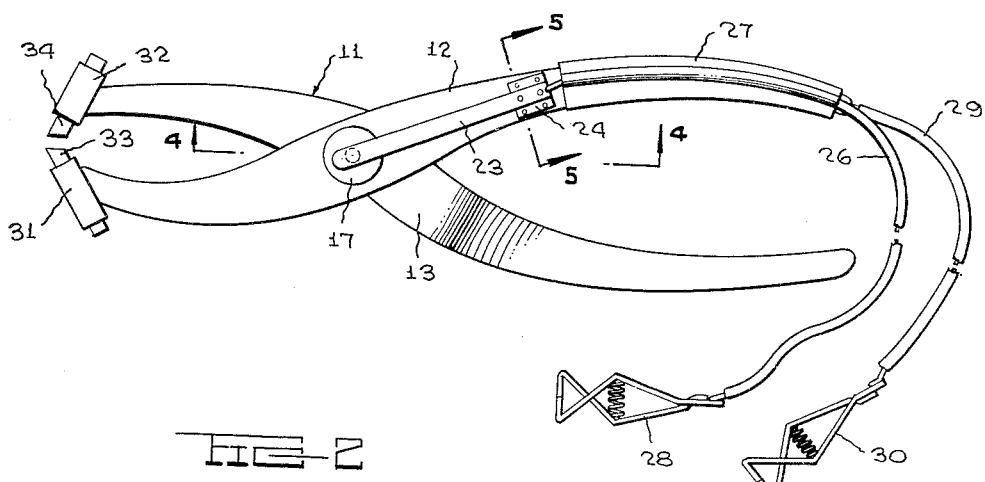
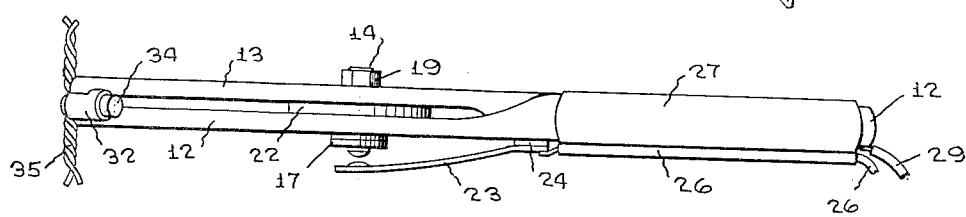
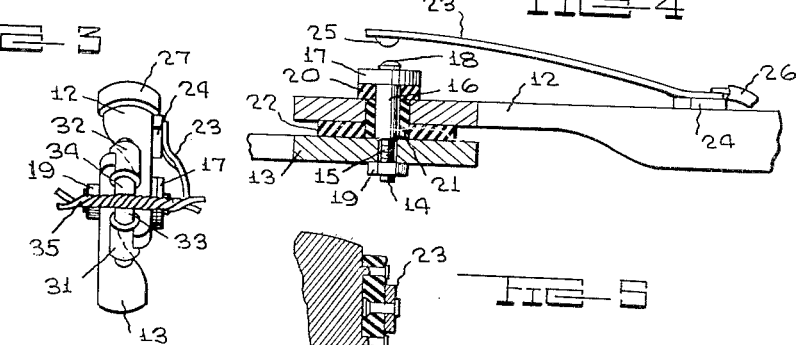
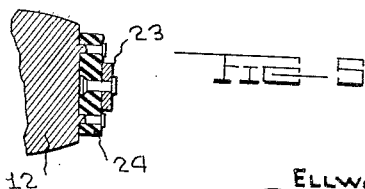

2,684,429

UNITED STATES PATENT OFFICE 2,684,429

SOLDERING TOOL

Ellwood R. Cory and George B. Warren,
Wolf Point, Mont.

Application April 10, 1951, Serial No. 220,182

3 Claims. (Cl. 219—26)

This invention relates to soldering tools, and more particularly to an electrical soldering tool of the plier type.

A main object of the invention is to provide a novel and improved soldering tool of the plier type which is simple in construction, which is easy to operate, and which provides a means of gripping the elements to be soldered during the soldering operation.

A further object of the invention is to provide an improved electrical soldering tool of the plier type which involves inexpensive parts, which is sturdy in construction, which enables difficult soldering operations to be performed in a rapid and efficient manner, and which is very economical in the use of solder.

Further objects and advantages of the invention will become apparent from the following description and claims, and from the accompanying drawings, wherein:

Figure 1 is a side elevational view of an improved electrical soldering tool constructed in accordance with the present invention;

Figure 2 is a top plan view of the soldering tool of Figure 1;

Figure 3 is a front end elevational view of the soldering tool of Figures 1 and 2;

Figure 4 is an enlarged cross-sectional fragmentary detail view taken on the line 4—4 of Figure 1;

Figure 5 is an enlarged fragmentary cross-sectional detail view taken on the line 5—5 of Figure 1.

Referring to the drawings, the tool is designated generally at 11 and comprises a first arm 12 and a second arm 13 pivotally connected together at their intermediate portions by a pivot bolt 14. The pivot bolt 14 comprises a threaded stud portion 15 and an enlarged shank portion 16 having the top flange 17 and provided concentrically with said flange with the contact element 18, as shown in Figure 4. The stud portion 15 extends through the intermediate portion of arm 13 and is clampingly secured thereto by a nut 19. An annular insulating ring 20 and an insulating sleeve 21 are provided on the shank portion 16 to insulate same from arm 12, and a large insulating washer 22 encircles the sleeve 21, and is disposed between arms 12 and 13, as shown in Figure 4, to insulate arm 12 from arm 13.

Designated at 23 is a resilient contact arm which is insulatingly secured at one end to the grip portion of arm 12, as by an insulating block 24 secured to arm 12 and to which the movable arm 23 is also secured, the arm 23 being arranged so that its free end, shown at 25, may be engaged with the contact element 18 when the arm 23 is moved inwardly toward arm 12. An insulated conductor 26 is connected to the secured end of the switch arm 23, said conductor 26 being anchored within a channeled fastening sleeve 27 secured on and extending along the grip portion of arm 12, a spring clip 28 being connected to the end of the conductor 26, as shown in Figure 1. Connected to the end of the grip portion of arm 12 is another insulated conductor 29 which is provided at its end with a spring clip 30.

The ends of the jaw portions of the plier arms 12 and 13 are formed with opposing inclined sleeve elements 31 and 32 in which are secured the respective opposing carbon electrodes 33 and 34. The sleeves 31 and 32 are directed so that their axes converge at a common point, whereby the inner ends of the electrodes 33 and 34 may be brought together responsive to the movement of the grip portions of arms 12 and 13 toward each other.

In using the device, the spring clips 28 and 30 are engaged on the respective terminals of a storage battery, and the wires to be spliced, such as the twisted wires shown at 35 in Figure 3, are gripped between the electrodes 33 and 34 by exerting squeezing pressure on the grip portions of arms 12 and 13. The operator then moves the switch arm 23 into contact with the stationary contact element 18, using the thumb or any other convenient finger of the hand which grips the implement. When the contact element 25 of the switch arm 23 engages the stationary contact element 18, a heating circuit for the work 35 is completed which comprises the battery, spring clip 30, conductor 29, arm 12, electrode 33, the work 35, the electrode 34, the arm 13, the pivot bolt 14, contact 18, contact 25, switch arm 23, conductor 26, and the spring clip 28 which is connected to the opposite pole of the battery. The current flowing through the electrodes 34 and 33 and the intervening work 35 heats the work to a high temperature, such that the work may be soldered by applying solder thereto in the usual manner.

It will be readily apparent that by the use of the implement above described, the work may be held and soldered in a rapid and convenient manner, and the direct heating of the work enables the soldered connection to be made by the use of a minimum amount of solder.

While a specific embodiment of an improved soldering tool of the plier type has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A soldering tool of the plier type comprising a first arm and a second arm of conductive material, means pivotally connecting said arms at their intermediate portions and including insulating material between the first and second arms, said means also including a pin member of conductive material extending through said insulating material and conductively engaging the second arm, respective electrodes at the ends of the arms arranged to engage each other, a first current supply conductor connected to one of the arms, a movable switch element insulatingly mounted on said one arm, contact means on said switch element, said contact means being axially aligned with and normally spaced from said pin member and movable into contact therewith, and a second current supply conductor connected to said switch element.

2. A soldering tool of the plier type comprising a first arm and a second arm of conductive material, a pin member of conductive material conductively secured to the intermediate portion of one arm and extending through the intermediate portion of the other arm, an insulating sleeve between said pin member and said other arm, whereby said arms are pivotally connected together, but are insulated from each other, a movable switch element insulatively mounted on said other arm, contact means on said switch element, said contact means being axially aligned with and normally spaced from said pin member and movable into contact therewith, respective electrodes at the ends of the arms arranged to engage each other, a first current supply conductor connected to said other arm, and a second current supply conductor connected to said switch element.

3. A soldering tool of the plier type comprising a first arm and a second arm of conductive material, a pin member of conductive material extending through the intermediate portions of said arms, a nut member threadedly engaged on one end of the pin member and conductively engaging the intermediate portion of one arm, a conductive contact head on the other end of the pin member, insulating means between said pin member and contact head and said other arm, whereby the arms are pivotally connected together but are insulated from each other, a resilient conductive switch arm insulatingly mounted on said other arm, contact means on said switch arm, said contact means being axially aligned with and normally spaced from said contact head and movable into contact therewith in response to a force applied to said switch arm, respective electrodes at the ends of the arms arranged to engage each other, a first current supply conductor connected to said other arm, and a second current supply conductor connected to said switch arm.

References Cited in the file of this patent

UNITED STATES PATENTS

| Number | Name | Date |
|---|---|---|
| 1,807,004 | Nelson | May 26, 1931 |
| 2,183,908 | Gladitz | Dec. 19, 1939 |
| 2,112,068 | Cole | Mar. 22, 1938 |

FOREIGN PATENTS

| Number | Country | Date |
|---|---|---|
| 100,480 | Australia | Mar. 18, 1937 |
| 421,019 | Great Britain | Dec. 12, 1934 |
| 926,788 | France | Oct. 10, 1947 |